United States Patent

Gluskoter et al.

[11] Patent Number: 5,622,064
[45] Date of Patent: Apr. 22, 1997

[54] COMPUTER ACCESS PORT LOCKING DEVICE AND METHOD

[75] Inventors: Steve Gluskoter; Steve Sands, both of Austin, Tex.

[73] Assignee: Dell USA, L.P., Austin, Tex.

[21] Appl. No.: 728,667

[22] Filed: Oct. 10, 1996

Related U.S. Application Data

[63] Continuation of Ser. No. 448,844, May 24, 1995, abandoned.

[51] Int. Cl.⁶ ............................................. E05B 73/00
[52] U.S. Cl. ........................... 70/14; 70/58; 248/551
[58] Field of Search ............................ 70/14, 18, 19, 70/30, 33, 34, 57, 58, 158–169, 181; 248/551–553

[56] References Cited

U.S. PATENT DOCUMENTS

| | | | |
|---|---|---|---|
| 3,971,240 | 7/1976 | Love, Sr. | 70/160 |
| 4,562,708 | 1/1986 | Gros | 70/159 X |
| 4,924,683 | 5/1990 | Derman | 70/14 |
| 4,964,285 | 10/1990 | Lakoski et al. | 70/14 |
| 5,117,661 | 6/1992 | Carl et al. | 70/14 |
| 5,199,286 | 4/1993 | Jakubas | 70/164 X |
| 5,267,688 | 12/1993 | Benefield | 70/164 X |
| 5,327,752 | 7/1994 | Myers et al. | 70/14 X |
| 5,377,512 | 1/1995 | Kelley | 70/14 X |
| 5,381,685 | 1/1995 | Carl et al. | 70/14 X |
| 5,419,165 | 5/1995 | Perkins | 70/14 |

FOREIGN PATENT DOCUMENTS

| | | | |
|---|---|---|---|
| 127020 | 12/1949 | Sweden | 70/14 |

*Primary Examiner*—Suzanne Dino
*Attorney, Agent, or Firm*—Haynes and Boone, L.L.P.

[57] ABSTRACT

A device and method for locking a computer access port. In a preferred embodiment, a locking device prevents removal of devices and media installed in a computer access port, but permits air circulation, visual access, and limited physical access. The locking device has an elongated member with an L-shaped engaging portion at one end and a barrel lock mechanism at the other end.

15 Claims, 3 Drawing Sheets

COMPUTER ACCESS PORT LOCKING DEVICE AND METHOD

This is a continuation of application(s) Ser. No. 08/448,844 filed on May 24, 1995 now abandoned.

BACKGROUND OF THE INVENTION

The present invention relates generally to computer access ports and methods of securing them from unauthorized entry and, in a preferred embodiment thereof, more particularly provides a computer access port locking device.

A computer will typically have a number of access ports in its housing. Among the computer devices installed in these access ports are floppy disk drives, removable hard drives, PC MCA card slots, tape drives, CD ROM drives, removable memory, ethernet and lan ports, and others. When valuable or sensitive data are stored on any of the storage devices or associated media, or when removal or tampering with any of these devices would cause unacceptable harm or disruption of normal activity, the user must find a way to secure the computer's access ports or risk such harm or disruption.

The means for securing computer access ports should not only prevent insertion or removal of any device or media. It should also, at the same time, allow free flow of needed air circulation about the device and allow access to visual parameters such as the drive activity light, whether or not a device is installed in the port, and whether or not media, if any, is installed in a device. Some physical access should also be provided, such as the ability to plug into a headphone jack in a CD ROM drive.

One example of the need for such a computer access port locking device is in the banking industry. Electronic banking transactions and data backups are many times conducted after business hours automatically via modem when there are no bank personnel present to monitor the computers. Tampering with the computers and the devices and media installed in them that store sensitive financial data would cause great harm to the bank.

One proposed solution to this problem involves a metal plate which is installed in a computer's floppy disk drive slot and extends around the bottom of the computer to a locking mechanism in the back of the computer housing. While this may prevent insertion or removal of a device or media in the computer, it does not allow use of the access port and device at the same time.

Another proposed solution is a locking door which covers the access port. Unfortunately, the locking door also blocks needed air circulation and prevents visual access to the device. The headphone jack on a CD ROM drive is blocked if a locking door is used. Furthermore, additional expenses are encountered in the manufacture of the computer since the door, hinges, and lock mechanism must be made a part of the computer housing itself.

It is accordingly an object of the present invention to provide a device and method for locking a computer access port that also allows adequate air circulation, prevents the unauthorized installation or removal of the device and associated media, and provides visual and partial physical access to the device.

SUMMARY OF THE INVENTION

In carrying out the principles of the present invention, in accordance with an embodiment thereof, a computer access port locking device is provided which allows adequate air circulation, prevents the unauthorized installation or removal of a device and associated media, and also allows the user visual and partial physical access to the device.

A preferred embodiment of the present invention provides a locking device for a computer having a housing with an opening through which a plurality of computer devices may be removably inserted into the interior of the housing to an operating orientation in which the devices are accessible via the opening, the housing having a first pair of opposing portions partially bounding the opening and being spaced apart in a first direction, and a second pair of opposing portions partially bounding the opening and being spaced apart in a second direction generally transverse to the first direction. The locking device includes an elongated locking member having first and second opposite end portions, and a width substantially less than the distance between the first pair of opposing housing portions, the first end portion being configured to engage one of the second pair of opposing housing portions for movement relative thereto between first and second positions in which disengagement of the first end portion from one of the second pair of opposing housing portions is respectively permitted and precluded. The locking device also includes locking means for releasably anchoring the second end portion of the locking member to the other one of the second pair of opposing housing portions in a manner releasably retaining the locking member first end portion in engagement, in the second position thereof, with one of the second pair of opposing housing portions.

The use of the disclosed computer access port locking device adds virtually nothing to the manufacturing cost of the computer, allows visual inspection of the access port, allows limited physical access, and does not block air circulation. It may be offered as a computer accessory since purchasers can now buy a computer with access port locking capability without having to buy the locking device at the same time.

DETAILED DESCRIPTION

Figure 1:
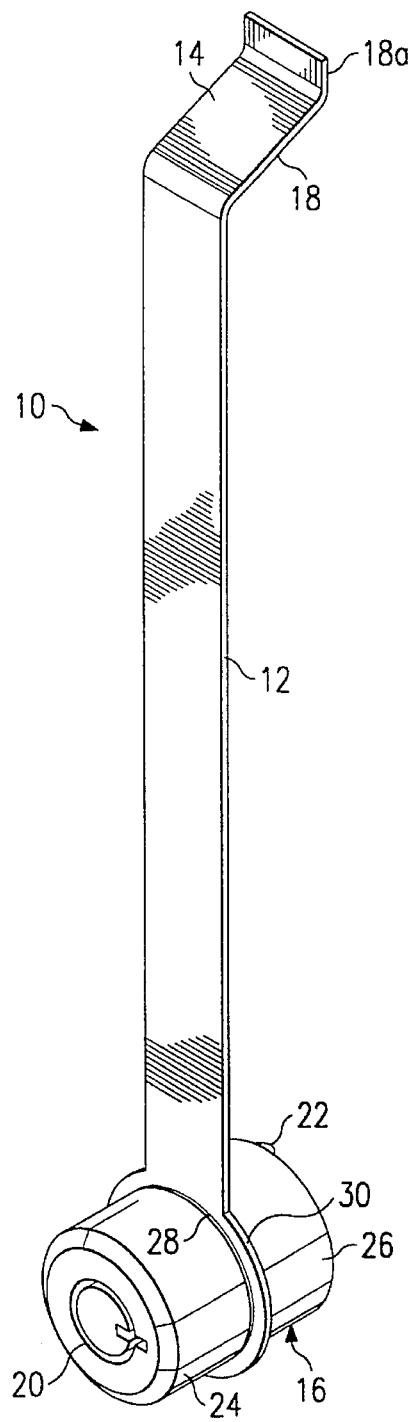
FIG. 1 is an isometric front view of a computer access port locking device embodying principles of the present invention.

Illustrated in FIG. 1 is a computer access port locking device 10 which embodies principles of the present invention. The locking device includes an elongated bar 12 with an L-shaped configuration 14 at one end and a barrel lock mechanism 16 at the other end.

The elongated bar 12 is made of a material sufficiently rigid and hard to prevent a person from easily cutting and bending it. Examples of suitable materials include metals, laminates, and composite materials.

Figure 4:
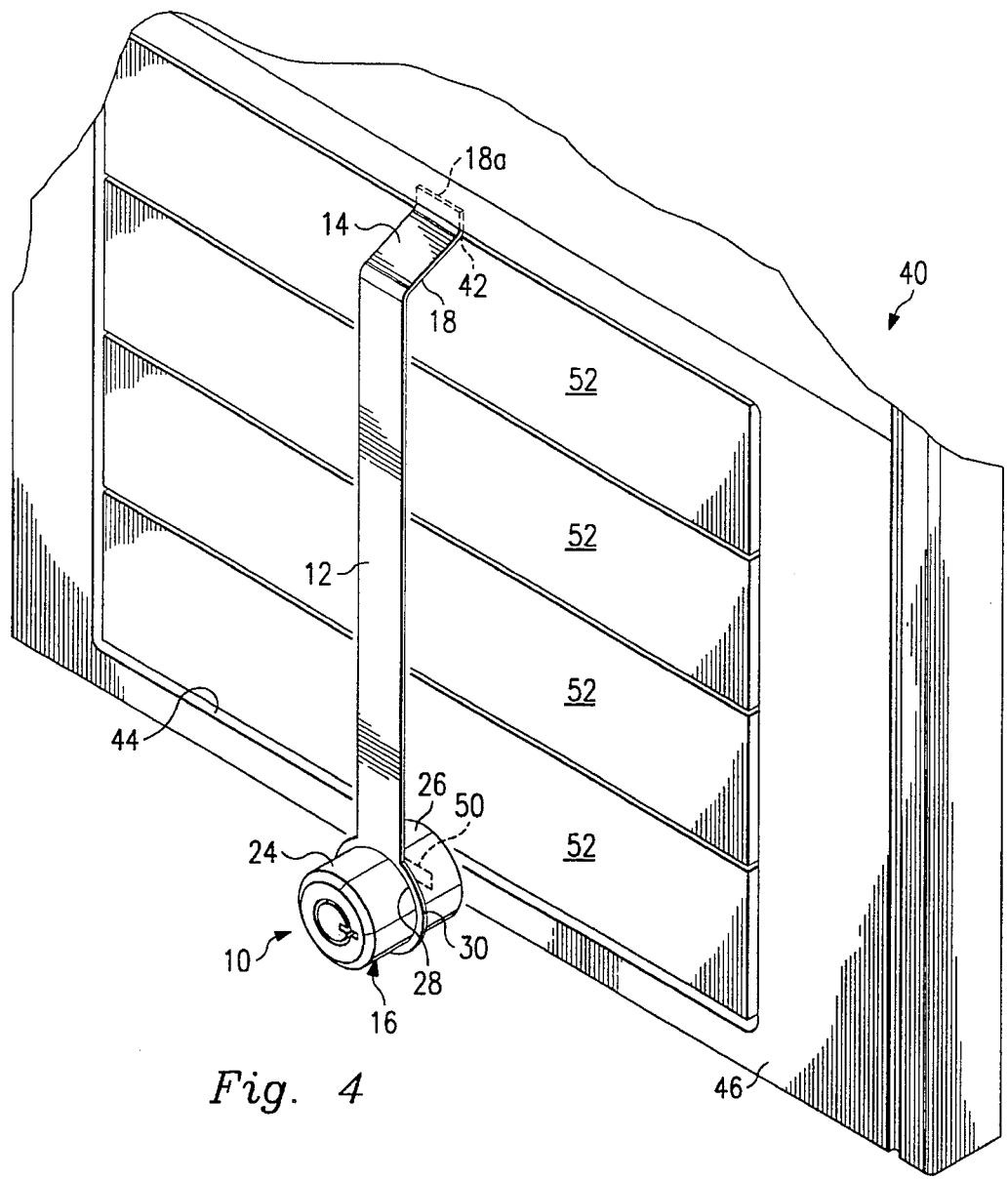
FIG. 4 is an isometric view of the computer access port locking device installed in a portion of a computer adapted to the use thereof.

The L-shaped configuration 14 at one end of the elongated bar 12 is suited for insertion into an opening 42 (FIG. 4) at one side of a computer access port 44 (FIG. 4). Other configurations would also be suitable for this purpose, for example, a J-shaped configuration or just the straight end of the elongated bar 12. The L-shaped configuration 14 shown in FIG. 1 provides an offset 18 which allows the elongated bar 12 to be located a distance from a device in an access port so as not to interfere with its operation. The offset 18 has an upturned outer end portion 18a insertable into the opening 42 as shown in phantom in FIG. 4.

The barrel lock mechanism 16 at the other end of the elongated bar 12 is of a conventional type commonly used at one end of a cable to prevent removal of a computer. It is shown here as an example of a lock mechanism that can be used with the present invention. The barrel lock mechanism 16 has a key insertion area 20 conveniently located in its front face and a locking pawl 22 extending from its rear face.

Figure 2:
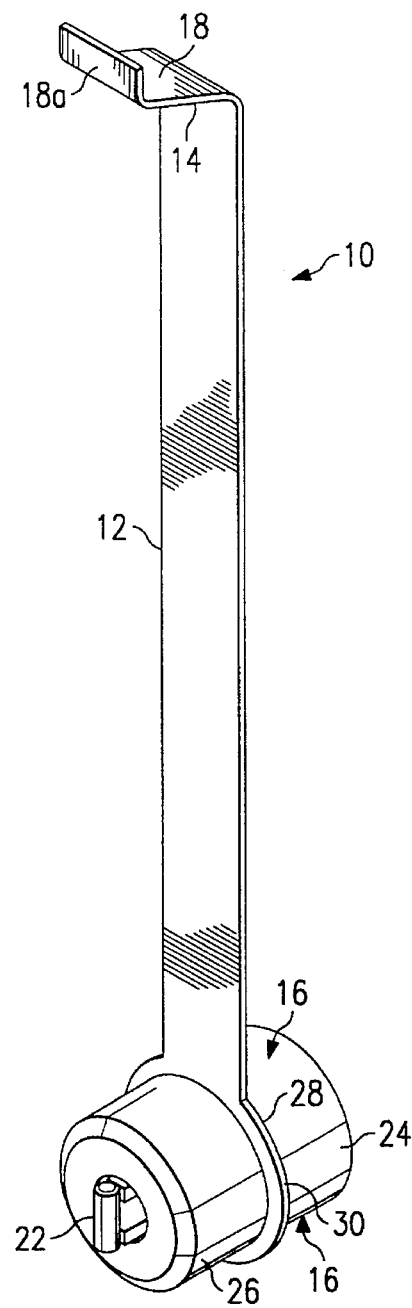
FIG. 2 is an isometric rear view of the computer access port locking device.

Turning now to FIG. 2, the computer access port locking device 10 can be seen from the rear side thereof. In this view, the locking pawl 22 of the barrel lock mechanism 16 is more clearly visible.

The locking pawl 22 is a T-shaped member extending from the rear face of the barrel lock mechanism 16. It is shown here as an example of an acceptable pawl type for use with the present invention.

This particular pawl type requires only that a slot 50, shown in phantom in FIG. 4, be provided in the face of a computer housing 46 (FIG. 4). When the barrel lock is rotated with a key, the locking pawl 22 rotates and thereby permits or precludes removal or insertion of the pawl in the corresponding slot 50 in the computer housing face 46. Some other conventional locking mechanisms useable with the present invention could have other pawl types.

Figure 3:
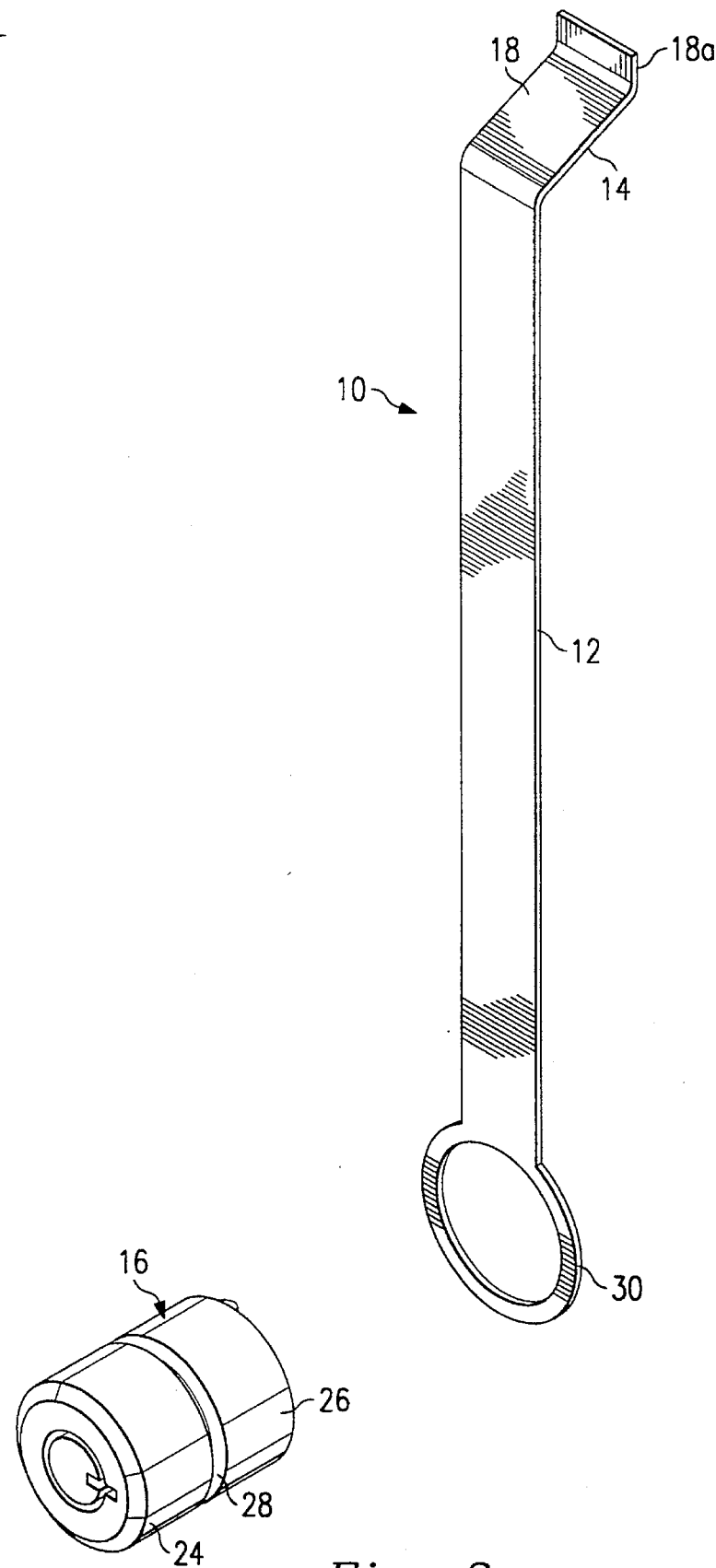
FIG. 3 is an isometric exploded view of the computer access port locking device.

Turning now to FIG. 3, an exploded view, showing the elongated bar 12 separated from the barrel lock mechanism 16 can be seen. In this view, the barrel lock mechanism 16 can be seen to have a front housing 24, a rear housing 26, and a reduced diameter mid section 28.

At one end of the elongated bar 12 is a flat annular portion 30 proportioned to complementarily fit into and be captively retained within the reduced diameter mid section 28 of the barrel lock mechanism 16. Attaching the elongated bar 12 to the barrel lock mechanism 16 at its mid section 28 provides an offset the length of the rear housing 26 matching the offset 18 in the L-shaped end 14.

Other methods of attaching the elongated bar 12 to the barrel lock mechanism 16 include welding the elongated bar to the barrel lock mechanism, forming the elongated bar as an integral part of the barrel lock mechanism housing, providing an aperture in one end of the elongated bar that the locking pawl 22 will pass through but that is too small for the barrel lock rear housing 26 to pass through, and other methods readily apparent to those skilled in the art.

Turning now to FIG. 4, the computer access port locking device 10 can be seen operatively installed on a portion of a computer 40 and extending across an access port 44 therein. A number of computer devices 52 are located in the front face 46 of the computer 40 within the access port 44. The computer access port locking device 10 is preventing removal of the computer devices 52 and any storage media, cards, etc. that may be installed in the devices while, at the same time, allowing air circulation about the computer devices, visual inspection of the computer devices, and limited physical access to the computer devices.

The computer devices 52 may contain storage media, such as CD ROM disks, tapes, and floppy disks, removable from the devices. Also, the computer devices 52 themselves, such as disk drives, PC MCA cards, tape drives, memory, and ethernet and lan ports, may be removable from the computer access port 44. In either case, the locking device 10 prevents removal of the computer device 52 and its associated storage media from the computer access port 44.

The opening 42 for receiving the upturned outer end portion 18a of the L-shaped configuration 14 at one end of the elongated bar 12 is representatively provided in the top side of the computer access port 44. The slot 50 for receiving the locking pawl 22 of the barrel lock mechanism 16 is representatively provided in the bottom side of the computer access port 44.

The locking device 10 is easily installed onto a portion of the computer 40. The upturned outer end portion 18a of the L-shaped configuration 14 is inserted into the opening 42. The locking device 10 is then rotated downward and the locking pawl 22 of the barrel lock mechanism 16 is inserted into the slot 50. The locking device 10 is then anchored to the computer 40 by rotation of the locking pawl 22 until it is transverse to the slot 50 using the key in the barrel lock mechanism 16. Removal of the computer devices 52 or their associated media from the computer 40 is precluded with the locking device 10 anchored to the computer 40 across the computer access port 44 in this manner.

Removal of the installed locking device 10 requires rotation of the locking pawl 22 until it is aligned with the slot 50 using the key in the barrel lock mechanism 16. The locking device 10 is then rotated upward to remove the locking pawl 22 from the slot 50. The upturned outer end portion 18a of the L-shaped configuration 14 may then be removed from the opening 42 in the computer 40, allowing removal of the computer devices 52 or their associated media.

Because the computer devices 52 are here illustrated being arranged horizontally one above the other, the elongated bar portion 12 of the locking device 10 is disposed vertically so that one locking device may conveniently prevent removal of all the computer devices 52 and associated media. Thus, one locking device may prevent removal of one or more computer devices depending on how the computer devices are arranged and depending on the location of the locking device when installed in its locked position.

The foregoing detailed description is to be clearly understood as being given by way of illustration and example only, the spirit and scope of the present invention being limited solely by the appended claims.

What is claimed is:

1. A locking device for a computer having a housing with a computer device opening through which a plurality of computer devices may be removably inserted into the interior of the housing to an operating orientation in which the devices are accessible through the opening, the housing having a first pair of opposing portions partially bounding the opening and being spaced apart in a first direction, and a second pair of opposing portions partially bounding the opening and being spaced apart in a second direction generally transverse to the first direction, said locking device comprising:

an elongated locking member having first and second opposite end portions, and a width substantially less than the distance between the first pair of opposing housing portions, said first end portion including a transverse end section configured to extend into a first locking member slot provided in one of the second pair of opposing housing portions adjacent the computer device opening for movement relative thereto between first and second positions so that in the first position, the first end portion is securely engaged in said first locking member slot and in the second position, the first end portion may be readily disengaged from said first locking member slot; and locking means for releasably anchoring said second end portion of said locking member configured to extend into a second locking member slot provided in the other one of the second pair of opposing housing portions so that in the first position, the second end portion is securely engaged in the second locking member slot and in the second position, the second portion is disengaged from second locking member slot.

2. The locking device according to claim 1, wherein said locking member is configured to be outwardly offset from the computer housing when said first end portion is in engagement, in said second position thereof, with said one of the second pair of opposing housing portions.

3. The locking device according to claim 1, wherein said locking member first end portion has an L-shape, said L-shape including the transverse end section.

4. The locking device according to claim 1, wherein said locking means includes a key-operated cylindrical lock.

5. The locking device according to claim 1, wherein the second end portion extends into the housing in a first direction and the transverse end section extends into the housing in a second direction transverse to the first direction.

6. A computer, comprising:

a housing having a computer device opening through which a plurality of computer devices may be removably inserted into the interior of the housing to an operating orientation in which the devices are accessible through the opening, a first pair of opposing portions partially bounding the opening and being spaced apart in a first direction, and a second pair of opposing portions partially bounding the opening and being spaced apart in a second direction generally transverse to the first direction;

an elongated locking member having first and second opposite end portions, and a width substantially less than the distance between said first pair of opposing housing portions, said first end portion including a transverse end section configured to extend into a first locking member slot provided in one of said second pair of opposing housing portions adjacent the computer device opening for movement relative thereto between first and second positions so that in the first position, the first end portion is securely engaged in said first locking member slot and in the second position, the first end portion may be readily disengaged from said first locking member slot; and locking means for releasably anchoring said second end portion of said locking member configured to extend into a second locking member slot provided in the other one of said second pair of opposing housing portions so that in the first position, the second end portion is securely engaged in the second locking member slot and in the second position, the second end portion is disengaged from said second locking member slot.

7. The computer according to claim 6, wherein said locking member is outwardly offset from said housing when said first end portion is in engagement, in said second position thereof, with said one of said second pair of opposing housing portions.

8. The computer according to claim 6, wherein said locking member first end portion has an L-shape, said L-shape including the transverse end section.

9. The computer according to claim 6, wherein said locking means includes a key-operated cylindrical lock.

10. The computer according to claim 6, wherein said second end portion extends into the housing in a first direction and the transverse end section extends into the housing in a second direction transverse to the first direction.

11. In a computer having a housing with a computer device opening through which a plurality of computer devices may be removably inserted into the interior of the housing to an operating orientation in which the devices are accessible through the opening, the housing having a first pair of opposing portions partially bounding the opening and being spaced apart in a first direction, and a second pair of opposing portions partially bounding the opening and being spaced apart in a second direction generally transverse to the first direction, a method for locking the opening comprising the steps of:

providing an elongated locking member having first and second opposite end portions, and a width substantially less than the distance between the first pair of opposing housing portions, said first end portion including a transverse end section configured to extend into a first locking member slot provided in one of the second pair of opposing housing portions adjacent the computer device opening for movement relative thereto between first and second positions so that in the first position, the first end portion is securely engaged in said first locking member slot and in the second position, the first end portion may be removed from said first locking member slot; and attaching locking means to said locking member second end portion for releasably anchoring said second end portion of said locking member configured to extend into a second locking member slot provided in the other one of the second pair of opposing housing portions so that in the first position, the second end portion is securely engaged in the second locking member slot and in the second position, the second end portion is disengaged from said second locking member slot.

12. The method according to claim 11, wherein said locking member providing step further comprises providing a locking member which is outwardly offset from the computer housing when said first end portion is in engagement, in said second position thereof, with said one of the second pair of opposing housing portions.

13. The method according to claim 11, wherein said step of providing includes providing said locking member first end portion with an L-shape, said L-shape including the transverse end section.

14. The method according to claim 11, wherein said locking means attaching step includes attaching a key-operated cylindrical lock to said locking member second end portion.

15. The method according to claim 11, wherein the second end portion extends into the housing in a first direction and the transverse end section extends into the housing in a second direction transverse to the first direction.

* * * * *